United States Patent
Marando

(10) Patent No.: US 6,412,818 B1
(45) Date of Patent: Jul. 2, 2002

(54) VEHICLE BODY AND FRAME ASSEMBLY AND METHOD OF MANUFACTURING SAME

(75) Inventor: Richard A. Marando, Mohrsville, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/650,956

(22) Filed: Aug. 29, 2000

Related U.S. Application Data

(60) Provisional application No. 60/151,782, filed on Aug. 31, 1999.

(51) Int. Cl.[7] .............................................. B62D 21/00
(52) U.S. Cl. ........................ 280/781; 280/798; 280/800
(58) Field of Search ............................... 280/781, 785, 280/798, 797, 799, 800; 29/897.2

(56) References Cited

U.S. PATENT DOCUMENTS

| | | | |
|---|---|---|---|
| 3,698,730 A | * 10/1972 | Hansen | 280/839 |
| 4,759,111 A | 7/1988 | Cudini | 29/523 |
| 5,070,717 A | 12/1991 | Boyd et al. | 72/55 |
| 5,149,132 A | * 9/1992 | Ruehl et al. | 280/800 |
| 5,333,775 A | 8/1994 | Bruggemann et al. | 228/157 |
| 5,491,883 A | 2/1996 | Marlinga | 29/421.1 |
| 5,561,902 A | 10/1996 | Jacobs et al. | 280/785 |
| 5,741,026 A | * 4/1998 | Bonnville | 280/781 |
| 5,855,394 A | * 1/1999 | Horton et al. | 280/781 |
| 6,003,935 A | * 12/1999 | Kalazny | 280/785 |
| 6,183,013 B1 | * 2/2001 | Mackenzie et al. | 280/797 |

* cited by examiner

Primary Examiner—Paul N. Dickson
Assistant Examiner—Mariano Sy
(74) Attorney, Agent, or Firm—MacMillan, Sobanski & Todd, LLC

(57) ABSTRACT

A ladder type of vehicular body and frame assembly includes a pair of side rails, each of which is formed from three separate members, namely, a front closed channel structural member, a center open channel structural member, and a rear closed channel structural member. The closed channel structural members may be formed having a generally rectangular cross sectional shape, while the open channel structural members may be formed having a generally C-shaped cross sectional shape. The rear ends of the front closed channel structural members are connected to the front ends of the center open channel structural members at respective joints, such as by welding, riveting, bolting, adhesives, magnetic pulse welding, and the like. Similarly, the rear ends of the center open channel structural members are connected to the front ends of the rear closed channel structural members at respective joints, such as by welding, riveting, bolting, adhesives, magnetic pulse welding, and the like. The closed channel structural members are preferably formed to the desired shape by hydroforming. The open channel structural members may be formed to the desired shape by any conventional metal forming process, such as by pressing or roll forming.

12 Claims, 2 Drawing Sheets

VEHICLE BODY AND FRAME ASSEMBLY AND METHOD OF MANUFACTURING SAME

CROSS REFERENCE TO RELATED APPLICATION

This application claims the benefit of U.S. Provisional Application No. 60/151,782, filed Aug. 31, 1999, the disclosure of which is incorporated herein by reference.

BACKGROUND OF THE INVENTION

This invention relates in general to methods for manufacturing body and frame assemblies for vehicles. More specifically, this invention relates to an improved method for manufacturing a ladder type of vehicular body and frame assembly including a pair of side rails, wherein each of the side rails has a front portion formed from a closed channel structural member, a center portion formed from an open channel structural member, and a rear portion formed from a closed channel structural member.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural members that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural members that are secured together, such as by welding, to provide a unitary structural member that extends the entire length of the vehicle body and frame assembly.

Traditionally, the side rails of known vehicle body and frame assemblies have been formed exclusively from open channel structural members, i.e., structural members that have a non-continuous cross sectional shape (U-shaped or C-shaped channel members, for example). Thus, it is known to use a single integral open channel structural member to form a side rail that extends the entire length of the vehicle body and frame assembly, as described above. Additionally, it is known to secure a plurality of such open channel structural members together to form the individual sections of a unitary side rail for a vehicle body and frame assembly, as also described above. However, the use of open channel structural members to form the side rails and cross members for vehicle body and frame assemblies has been found to be undesirable for several reasons. First, it is relatively time consuming and expensive to bend multiple portions of the side rails to conform to a desired final shape, as is commonly necessary. Second, after such bending has been performed, a relatively large number of brackets or other mounting devices must usually be secured to each of the side rails to facilitate the attachment of the various components of the vehicle to the body and frame assembly. Third, in those instances where the side rails are formed from a plurality of individual sections, it has been found difficult to maintain dimensional stability throughout the length of the side rail when the individual side rail sections are secured together.

More recently, it has been proposed to form the side rails and the cross members from closed channel structural members, i.e., structural members that have a continuous cross sectional shape (tubular or box-shaped channel members, for example). In vehicle body and frame assemblies of this type, it is known that the closed channel structural member may be deformed to a desired shape by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member is deformed into the desired final shape.

Hydroforming has been found to be a desirable forming process because portions of a closed channel structural member can be quickly and easily deformed to have a complex cross sectional shape. In those instances where the perimeter of the closed channel structural member is essentially the same as the perimeter of the die cavity, the cross sectional shape of the closed channel structural member is changed during the hydroforming process. However, at least ideally, the wall thickness of the closed channel structural member should remain relatively constant throughout the deformed region. Hydroforming has also been found to be a desirable forming process because portions of a closed channel structural member can be quickly and easily expanded from a relatively small perimeter to a relatively large perimeter. In those instances where the perimeter of the closed channel structural member is somewhat smaller than the perimeter of the die cavity, not only is the cross sectional shape of the closed channel structural member changed during the hydroforming process, but the wall thickness thereof is decreased. However, at least ideally, the wall thickness of the closed channel structural member should decrease uniformly through the expanded region.

Such variations in the wall thickness of the closed channel structural member are usually considered to be undesirable because they can result in undesirable weaknesses in the formed closed channel structural member. One solution is to increase the wall thickness of the entire closed channel structural member such that the most extreme reductions in the wall thickness thereof would not adversely affect the overall strength of the member for its intended use. However, such over-designing undesirably increases the overall weight and cost of the closed channel structural member and the resultant vehicle frame component. An alternative solution is to employ a process known as end feeding. End feeding involves applying a mechanical force against one or both end portions of the closed channel structural member simultaneously as the interior portion is expanded. As a result, some of the metallic material of the end portions flows into the interior portion being expanded, thus minimizing the reduction in the wall thickness thereof. End feeding has been found to function satisfactorily in many instances, particularly when the interior portion being expanded is located relatively near to the ends portions, when the overall length of the closed channel structural member is relatively short, and when the shape of the closed channel structural member is relatively straight. This is because the end feeding process is somewhat limited in its ability to cause the metallic material of the end portions of the closed channel structural member to flow into the expanded interior portion.

Unfortunately, it has been found that the side rails and other components of some vehicle body and frame assemblies are sufficiently long or complex in shape as to render the end feeding process ineffective to minimize the undesirable reduction in the wall thickness when the interior portion of the closed channel structural member is expanded during hydroforming. Thus, it would be desirable to provide an improved structure for a vehicle frame assembly and method of manufacturing same that can provide side rails that are too long or complex in shape to effectively hydroform as a whole.

SUMMARY OF THE INVENTION

This invention relates to an improved structure and method for manufacturing a ladder type of vehicular body and frame assembly. Each of the side rails is formed from three separate members, namely, a front closed channel structural member, a center open channel structural member, and a rear closed channel structural member. The front and rear closed channel structural members may be formed having a generally rectangular cross sectional shape, while the center open channel structural members may be formed having a generally C-shaped cross sectional shape. The rear ends of the front closed channel structural members are connected to the front ends of the center open channel structural members at respective joints, such as by welding, riveting, bolting, adhesives, magnetic pulse welding, and the like. Similarly, the rear ends of the center open channel structural members are connected to the front ends of the rear closed channel structural members at respective joints, such as by welding, adhesives, magnetic pulse welding, and the like. The closed channel structural members are preferably formed to the desired shape by hydroforming. The open channel structural members may be formed to the desired shape by any conventional metal forming process, such as by pressing or roll forming.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
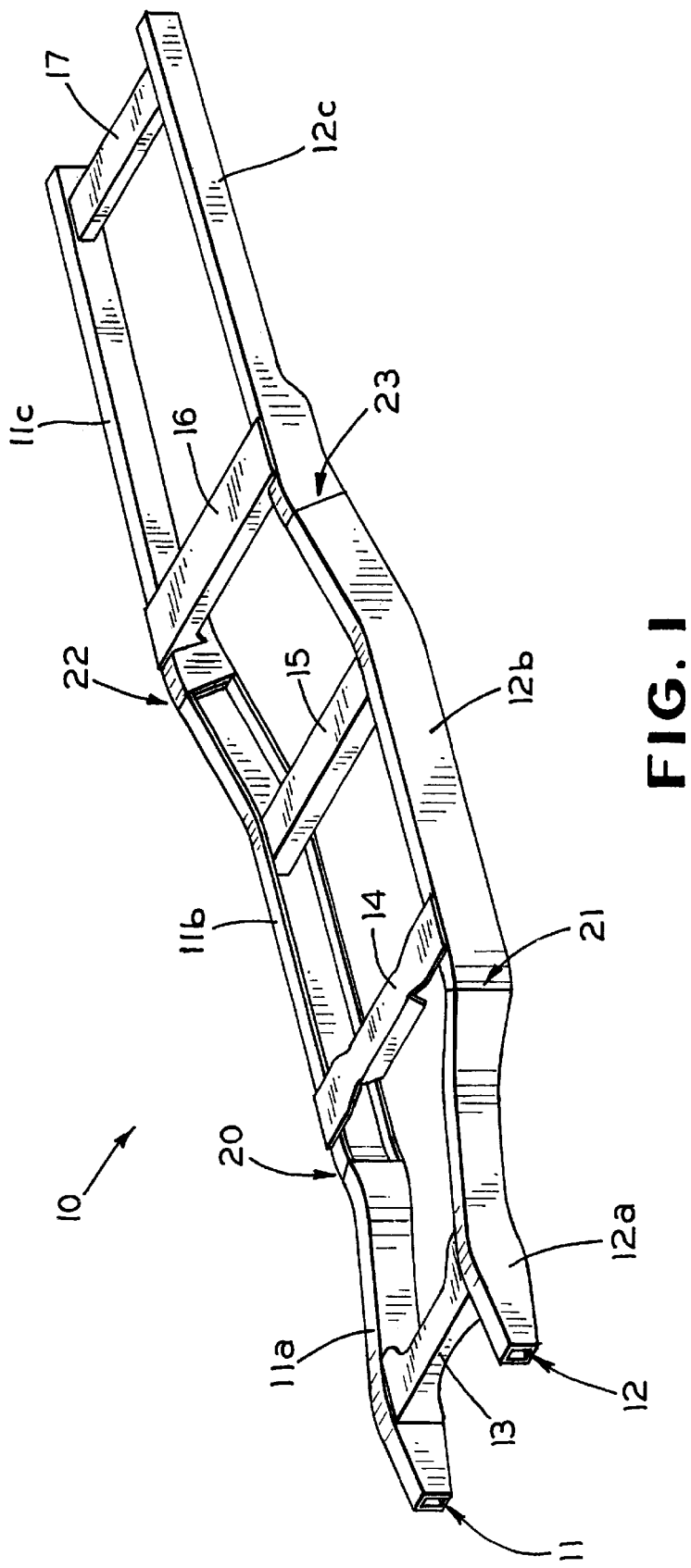
FIG. 1 is a perspective view of a vehicle frame assembly manufactured in accordance with the structure and method of this invention.
Figure 2:
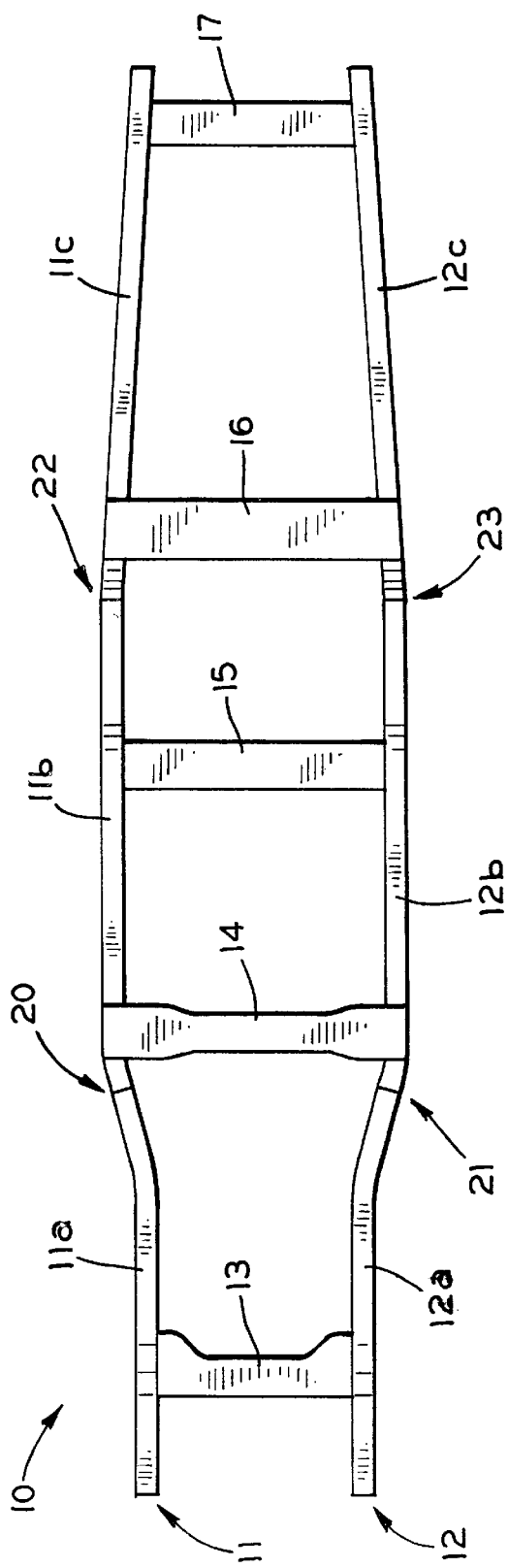
FIG. 2 is a top plan view of the vehicle frame assembly illustrated in FIG. 1.
Figure 3:
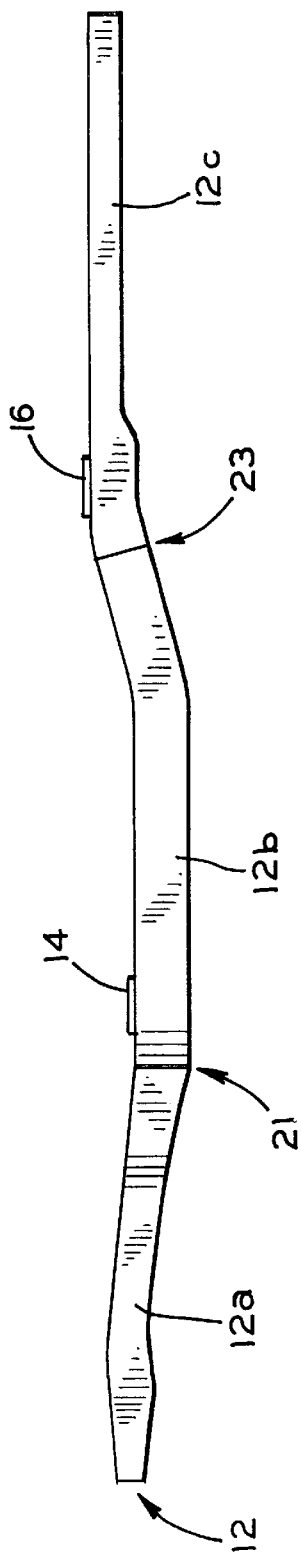
FIG. 3 is a side elevational view of the vehicle frame assembly illustrated in FIGS. 1 and 2.

Referring now to the drawings there is schematically illustrated in FIG. 1 a portion of a vehicle frame assembly, indicated generally at 10, that is manufactured in accordance with the structure and method of this invention. The illustrated vehicle frame assembly 10 is a ladder frame assembly including a pair of longitudinally extending side rails, indicated generally at 11 and 12, or similar structural members having a plurality of transverse cross members 13, 14, 15, 16, and 17 or similar structural members extending therebetween. The side rails 11 and 12 extend longitudinally throughout the entire length of the assembly 10 and are generally parallel to one another. The cross members 13 through 17 extend generally perpendicular to the side rails 11 and 12 and may be formed having any conventional structure. The cross members 13 through 17 are spaced apart from one another along the length of the ladder frame assembly 10 and can be secured to the side rails 11 and 12 by any conventional means, such as by welding, riveting, bolting, adhesives, magnetic pulse welding, and the like. When secured to the side rails 11 and 12, the cross members 13 through 17 provide lateral and torsional rigidity to the ladder frame assembly 10. The cross members 13 through 17 may be formed from either open or closed channel structural members, or combination thereof, as desired. Additional bracing and reinforcement (not shown) can be added as desired to the cross members 13 through 17. Conventional mounts, brackets, and hangers (not shown) may be provided on the vehicle frame assembly as desired as well.

The first side rail 11 is formed from three separate members, namely, a front closed channel structural member 11a, a center open channel structural member 11b, and a rear closed channel structural member 11c. Similarly, the second side rail 12 is formed from three separate members, namely, a front closed channel structural member 12a, a center open channel structural member 12b, and a rear closed channel structural member 12c. Each of the members of the side rails 11 and 12 can be formed from any desired material that is suitable for use in a vehicle frame component, such as, for example, aluminum, an alloy of aluminum, steel, a structural steel alloy (containing such elements as Ti, V, Ni, Cr, Mg, Mn, etc.), or a composite material such as carbon fiber. The various members of the side rails 11 and 12 may be formed from the same or differing materials as desired.

The illustrated front closed channel structural members 11a and 12a are formed having a generally rectangular cross sectional shape, each including generally vertically extending inner and outer walls and generally horizontally extending upper and lower walls. However, the front closed channel structural members 11a and 12a may be formed having any desired closed cross sectional shape. The illustrated center open channel structural members 11b and 12b are formed having a generally C-shaped cross sectional shape, each including a generally vertically extending web and generally horizontally extending upper and lower flanges. However, the center open channel structural members 11b and 12b may be formed having any desired open cross sectional shape. The illustrated center open channel structural members 11b and 12b are preferably oriented such that the vertically extending web portions are located on the outer sides of the vehicle frame assembly 10, although such is not required. The illustrated rear closed channel structural members 11c and 12c are formed having a generally rectangular cross sectional shape, each including generally vertically extending inner and outer walls and generally horizontally extending upper and lower walls. However, the rear closed channel structural members 11c and 12c may be formed having any desired closed cross sectional shape.

The rear ends of the front closed channel structural members 11a and 12a are connected to the front ends of the center open channel structural members 11b and 12b at respective joints, indicated generally at 20 and 21. The joints 20 and 21 may be formed in any conventional manner, such as by welding, riveting, bolting, adhesives, magnetic pulse welding, and the like. If desired, portions of the rear ends of the front closed channel structural members 11a and 12a and the front ends of the center open channel structural members 11b and 12b may overlap at such joints 20 and 21. Alternatively, the rear ends of the front closed channel structural members 11a and 12a and the front ends of the center open channel structural members 11b and 12b may abut one another without overlapping. If desired, the structures of the joints 20 and 21 may be different.

Similarly, the rear ends of the center open channel structural members 11b and 12b are connected to the front ends of the rear closed channel structural members 11c and 12c at respective joints, indicated generally at 22 and 23. The joints 22 and 23 may be formed in any conventional manner, such as by welding, riveting, bolting, adhesives, magnetic pulse welding, and the like. If desired, portions of the rear ends of the center open channel structural members 11b and 12b and the front ends of the rear closed channel structural members 11c and 12c may overlap at such joints 22 and 23. Alternatively, the rear ends of the center open channel structural members 11b and 12b and the front ends of the rear closed channel structural members 11c and 12c may abut one another without overlapping. If desired, the structures of the joints 22 and 23 may be different.

The front closed channel structural members 11a and 12a are preferably formed to the desired shape by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member is deformed into the desired final shape. Hydroforming has been found to be a desirable forming process because portions of a closed channel structural member can be quickly and easily deformed to have a complex cross sectional shape. The center open channel structural members 11b and 12a may be formed to the desired shape by any conventional metal forming process, such as by pressing or roll forming. The rear closed channel structural members 11c and 12c are also preferably formed to the desired shape by hydroforming.

In accordance with the provisions of the patent statutes, the principle and mode of operation have been described and illustrated in its preferred embodiment. However, it must be understood that this invention may be practiced otherwise than as specifically explained and illustrated without departing from its spirit or scope.

What is claimed is:

1. A method of manufacturing a vehicle frame assembly comprising the steps of:
   (a) providing a first front closed channel structural member, a first center open channel structural member, and a first rear closed channel structural member as three separate structural members;
   (b) securing the first front closed channel structural member, the first center open channel structural member, and the first rear closed channel structural member together to form a first side rail;
   (c) providing a second front closed channel structural member, a second center open channel structural member, and a second rear closed channel structural member as three separate structural members;
   (d) securing the second front closed channel structural member, the second center open channel structural member, and the second rear closed channel structural member together to form a second side rail; and
   (e) connecting a plurality of cross members between the first and second side rails to form the vehicle frame assembly.

2. The method defined in claim 1 wherein said step (a) is performed by initially hydroforming at least one of the first front closed channel structural member and the first rear closed channel structural member to have a desired shape.

3. The method defined in claim 2 wherein said step (c) is performed by initially hydroforming at least one of the second front closed channel structural member and the second rear closed channel structural member to have a desired shape.

4. The method defined in claim 1 wherein said step (a) is performed by initially hydroforming both of the first front closed channel structural member and the first rear closed channel structural member to have desired shapes.

5. The method defined in claim 4 wherein said step (c) is performed by initially hydroforming both of the second front closed channel structural member and the second rear closed channel structural member to have desired shapes.

6. The method defined in claim 1 wherein each of the front closed channel structural members is generally rectangular in shape.

7. The method defined in claim 1 wherein each of the center open channel structural members is generally C-shaped.

8. The method defined in claim 1 wherein each of the rear closed channel structural members is generally rectangular in shape.

9. The method defined in claim 1 wherein each of the front closed channel structural members as being generally rectangular in shape, each of the center open channel structural members is generally C-shaped, and each of the rear closed channel structural members is generally rectangular in shape.

10. The method defined in claim 1 wherein the front closed channel structural members are provided with rear ends that are respectively connected to front ends of the center open channel structural members.

11. The method defined in claim 1 wherein the center open channel structural members are provided with rear ends that are respectively connected to front ends of the rear closed channel structural members.

12. The method defined in claim 1 wherein the front closed channel structural members are provided with rear ends that are respectively connected to front ends of the center open channel structural members, and the center open channel structural members are provided with rear ends that are respectively connected to front ends of the rear closed channel structural members.

* * * * *